(12) United States Patent
Giammaria

(10) Patent No.: US 6,772,158 B1
(45) Date of Patent: Aug. 3, 2004

(54) APPARATUS FOR DATA DEPOTING AND METHOD THEREFOR

(75) Inventor: Alberto Giammaria, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/460,855

(22) Filed: Dec. 14, 1999

(51) Int. Cl.[7] .................. G06F 17/30; G06F 15/173; H04J 3/08; H04L 12/28; G02B 6/28
(52) U.S. Cl. .................. 707/10; 707/103 R; 709/223; 709/224; 370/501; 370/389; 370/216; 385/24
(58) Field of Search .................. 707/10, 103 R; 709/223, 224; 370/501, 389, 16; 385/24

(56) References Cited

U.S. PATENT DOCUMENTS

| | | | | |
|---|---|---|---|---|
| 4,422,171 A | * | 12/1983 | Wortley et al. ............. | 714/748 |
| 4,451,916 A | * | 5/1984 | Casper et al. ............... | 370/16 |
| 4,864,564 A | * | 9/1989 | Parker et al. ............... | 370/349 |
| 5,331,635 A | * | 7/1994 | Ota ........................... | 370/75.13 |
| 5,550,803 A | * | 8/1996 | Crayford et al. ........... | 370/13 |
| 5,592,486 A | * | 1/1997 | Lo et al. .................... | 370/389 |
| 5,615,340 A | * | 3/1997 | Dai et al. ................... | 395/200.17 |
| 5,680,602 A | * | 10/1997 | Bloem et al. ............... | 707/1 |
| 5,745,783 A | | 4/1998 | Suzuki et al. .............. | 395/825 |
| 5,751,952 A | * | 5/1998 | Dai et al. ................... | 395/200.8 |
| 5,754,763 A | | 5/1998 | Bereiter ..................... | 395/187.01 |
| 5,761,425 A | * | 6/1998 | Miller ........................ | 395/200.48 |
| 5,842,212 A | | 11/1998 | Ballurio et al. ............ | 707/100 |
| 5,912,998 A | * | 6/1999 | Quayle ...................... | 385/24 |
| 5,974,052 A | * | 10/1999 | Johnson et al. ............ | 370/467 |
| 6,016,308 A | * | 1/2000 | Crayford et al. ........... | 370/252 |
| 6,185,607 B1 | * | 2/2001 | Lo et al. .................... | 709/213 |
| 6,335,939 B1 | * | 1/2002 | Hanna et al. .............. | 370/501 |
| 6,434,680 B2 | * | 8/2002 | Belknap et al. ............ | 711/161 |

FOREIGN PATENT DOCUMENTS

| | | | | |
|---|---|---|---|---|
| EP | 0055404 A1 | * | 7/1982 | ............. H04L/1/18 |
| EP | 0251383 A2 | * | 7/1988 | ........... H04L/11/20 |
| EP | 0453863 A2 | * | 10/1991 | ........... H04L/29/06 |
| EP | 0 711 088 | | 5/1996 | |
| GB | 2193614a | * | 10/1988 | ............ H04B/7/00 |
| GB | 2282747 A | * | 5/1995 | ............. G06F/5/06 |
| JP | 9-331323 | | 12/1997 | |
| JP | 10-303890 | | 11/1998 | |
| WO | WO 97/15018 | | 4/1997 | |

OTHER PUBLICATIONS

"Distributed Object Encapsulation of Customer Information Control System Distributed Transaction Processing," IBM Technical Disclosure Bulletin, vol. 38 No. 1, Jan. 1995,pp. 177–180.

(List continued on next page.)

Primary Examiner—Frantz Coby
(74) Attorney, Agent, or Firm—Barry S. Newberger; Winstead Sechrest & Minick P.C.; Leslie A. Van Leeuwen

(57) ABSTRACT

An apparatus and method by which repeaters are able to temporarily or permanently store data in a local repository called a depot. Two uses for the depots are checkpoint restart functionality and the ability to store commonly installed software distributions on nodes closer to their destinations. Large software programs such as Office 95™ can be stored on local repeaters for fast and efficient distribution. A particular distribution can be stored in more than one depot. Depots will provide an interface to allow administrators to list the contents of a depot, store new distributions and delete old distributions. Data may be added to a depot by either an explicit administrator command or by retaining data sent as part of a distribution. Applications can decide what data is appropriate for depoting, and mark those distribution segments as "storable".

20 Claims, 4 Drawing Sheets

OTHER PUBLICATIONS

"Reconciliation of Shadowed Mail Items with Master," IBM Technical Disclosure Bulletin, vol. 33 No. 6B, Nov. 1990, pp. 120–121.

"Riadata—An Automated Retain Incident Analysis Facility," IBM Technical Disclosure Bulletin, vol. 34 No. 10A, Mar. 1992, pp. 278–283.

Wiener, J.L. et al., "OODB Bulk Loading Revisited: the Partitioned–list Approach," International Conference on Very Large Data Bases, 21st, Zurich, Sep. 11–15, 1995, Proceedings of VLDB '95, pp. 30–41.

Muntz, D.A. et al., "Evaluating Delayed Write in a Multi-level Caching File System," IFIP/IEEE International Conference on Distributed Platforms, [Dresden, Feb. 27–Mar. 1, 1996], Proceedings: Client/Server and Beyond, pp. 415–429.

Jakoby, A. et al., "Data Transmission in Processor Networks," International Workshop on Distributed Algorithms, 9th, Proceedings of WDAG '95, pp. 145–159.

Joshi, A. et al., "On Disconnected Browsing of Distributed Information," International Workshop on Research Issues in Data Engineering, 7th, Birmingham, UK, Apr. 7–8, 1997, Proceedings: High Performance Database Management for Large–scale Applications, pp. 101–107.

* cited by examiner

APPARATUS FOR DATA DEPOTING AND METHOD THEREFOR

CROSS-REFERENCE TO RELATED APPLICATIONS

Related subject matter may be found in the following commonly assigned, U.S. Patent Applications which are hereby incorporated by reference herein:

Ser. No. 09/460,855, entitled "APPARATUS FOR DATA DEPOTING AND METHOD THEREFOR"

Ser. No. 09/460,853, entitled "APPARATUS FOR RELIABLY RESTARTING INTERRUPTED DATA TRANSFER AT LAST SUCCESSFUL TRANSFER POINT AND METHOD THEREFOR"

Ser. No. 09/438,437, entitled "AN APPARATUS AND METHOD FOR DISTRIBUTING AND COLLECTING BULK DATA BETWEEN A LARGE NUMBER OF MACHINES" and filed concurrently herewith;

Ser. No. 09/458,268, entitled "COMPUTER NETWORK CONTROL SYSTEMS AND METHODS" and filed concurrently herewith;

Ser. No. 09/460,852; entitled "METHODS OF DISTRIBUTING DATA IN A COMPUTER NETWORK AND SYSTEMS USING THE SAME";

Ser. No. 09/458,269, entitled "SYSTEMS AND METHODS FOR REAL TIME PROGRESS MONITORING IN A COMPUTER NETWORK";

Ser. No. 09/460,851, entitled "APPARATUS FOR AUTOMATICALLY GENERATING RESTORE PROCESS DURING SOFTWARE DEPLOYMENT AND METHOD THEREFOR";

Ser. No. 09/460,854, entitled "AN APPARATUS FOR JOURNALING DURING SOFTWARE DEPLOYMENT AND METHOD THEREFOR"; and Ser. No. 09/438,436, entitled "AN APPARATUS FOR CONNECTION MANAGEMENT AND METHOD THEREFOR".

TECHNICAL FIELD

The present invention relates generally to data processing systems, and in particular, to temporary or permanent storage of bulk data distributions within networked data processing systems.

BACKGROUND INFORMATION

Present day data processing systems are often configured in large multi-user networks. Management of such networks may typically include the need to transfer bulk data to an endpoint system from a source system (or, simply, "a source") and the collection of information, for example, error reports from a multiplicity of endpoints systems (or, simply, "endpoints").

Such large data transfers may occur within a network, for example, to distribute software updates. The system administrator may need to allocate a specific period of time for the data transfer to more efficiently utilize network resources. This may typically occur when the communication load on the system is lowest, usually at night when most endpoint users are not working at their stations. The system administrator may load the bulk data and the corresponding transfer instructions onto the network system's source, or server, in preparation for the transfer. At the predetermined time set by the administrator, the server will push the data while ensuring that the bulk data is successfully transferred to each of the desired endpoint locations. However, during the transfer a portion of the system server is dedicated to the data transfer and thus unavailable for other networking tasks. Moreover, as the number of endpoints which must be simultaneously serviced by the bulk data distribution increases, network bandwidth demands are concomitantly increased. This complicates scalability of the bulk-distribution systems.

Therefore, a need exists in the art for a bulk distribution mechanism that can transfer large amounts of data between network connected subsystems (or nodes) while maintaining scalability. Additionally, there is a need in such distribution mechanisms for methods and apparatus to distribute bulk data to a multiplicity of endpoints and to collect bulk data, including large log files, from the endpoints. These methods and apparatus may facilitate the bulk distribution of data by storing the data at intermediate nodes in the network, thereby reducing network bandwidth demand.

SUMMARY OF THE INVENTION

As described in the co-pending, commonly owned U.S. Patent Application entitled "A Method and Apparatus for Distributing and Collecting Bulk Data Between Data Processing Systems," Ser. No. 438,437, incorporated herein by reference bulk data transfers are mediated by one or more repeaters between the server and endpoint. Each repeater includes a local repository which may be referred to as a "depot" for the storage of data being transferred between servers and endpoints. Two uses of the depots are checkpoint restart functionality which allow an interrupted delivery to be automatically restarted from a predetermined point, and the ability to store commonly installed software distributions on nodes closer to their destinations. (Checkpoint restart is discussed in detail in the commonly-owned, co-pending U.S. Patent Application entitled "Apparatus for Restarting Interrupted Data Transfer and Method Therefor," Ser. No. 09/460,853, incorporated herein by reference.) For example, large software packages like Office 95™ can be stored on local repeaters or gateway repeaters for fast and efficient distribution. A particular distribution can be stored in more than one repeater. For purposes of this application, the term depot is used interchangeably with repeater; however, it would be understood by an artisan of ordinary skill that, in general, repeaters incorporate functionality for depoting data in accordance with a portion of the depoting methodology of the present invention and discussed below in conjunction with FIG. 3, in addition to providing other functionality as discussed in the aforesaid U.S. Patent Application entitled "A Method and Apparatus for Distributing and Collecting Bulk Data Between Data Processing Systems."

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

When large distributions are sent through a network, network inefficiencies will occur when all network assets are not available to the distribution. These inefficiencies cause network slowdowns due to increased data traffic. The present invention allows the distributions to be depoted on repeaters near the intended endpoints. Depoting allows the system to more efficiently utilize network assets by determining the availability of endpoints for the transferring of the data.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
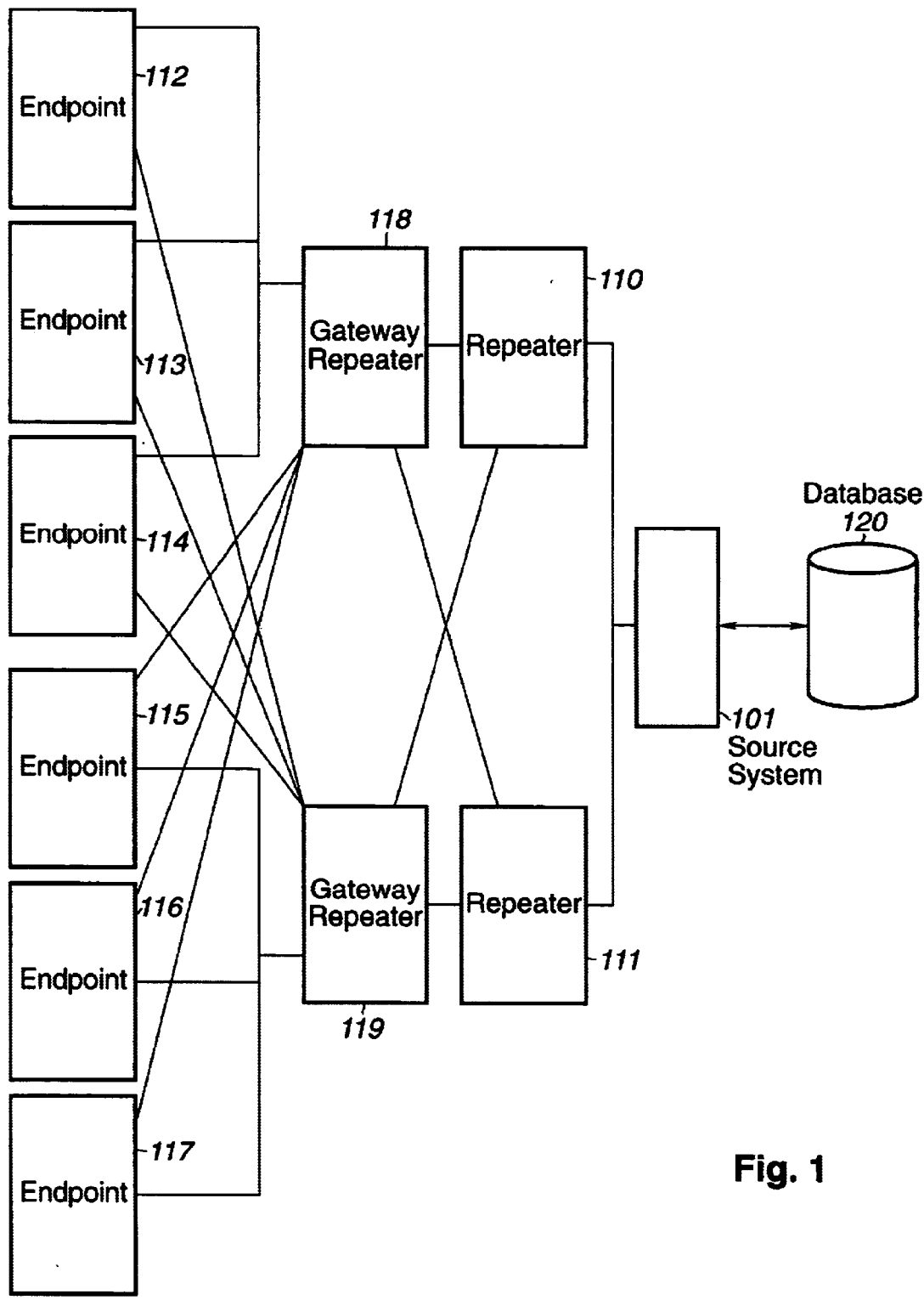
FIG. 1 illustrates, in block diagram form, a data processing network in accordance with one embodiment of the present invention.

FIG. 1 illustrates a communications network 100. The subsequent discussion and description of FIG. 1 are provided to illustrate an exemplary environment used by the present invention.

The network system 100 includes server 101, one or more fan out/collector nodes referred to as repeaters 110, 111, 118, 119, and a plurality of resources (which may also be referred to as clients or endpoints) 112–117. Additionally, certain repeaters, such as 118 and 119, are directly connected to one or more endpoints, in the exemplary embodiment of FIG. 1, endpoints 112–114 or 115–117, respectively, and may be referred to as "gateway" repeaters (or, simply, "gateways").

Server 101 provides distribution services with respect to resources 112–117. Repeater 110 may be the primary repeater through which resources 112–114 receive their data transfers, and repeater 111, likewise, may primarily service endpoints 115–117. Additionally, any report-back of successful transfers will be transmitted primarily via the endpoints primary domain except as explained below. It would be understood by an artisan of ordinary skill that additional repeaters may be inserted into the network and may be arranged in a multi-level hierarchy according to the demands imposed by the network size. Gateway repeaters 118 and 119 are such repeaters in the exemplary embodiment of FIG. 1.

However, in its preferred embodiment, network system 100 provides cross connections in order to provide redundant, parallel communication paths should the primary communication path to the endpoint become unavailable. For example, in FIG. 1, endpoint 114 has a primary pathway to server 101 through repeaters 118 and 110. Should repeater 110 become unavailable, server 101 can transfer bulk data to endpoint 114 via an alternative pathway through repeaters 118 and 111. Additionally, should repeater 118 become unavailable, endpoint 114 may receive data via repeaters 111 and 119.

Figure 2:
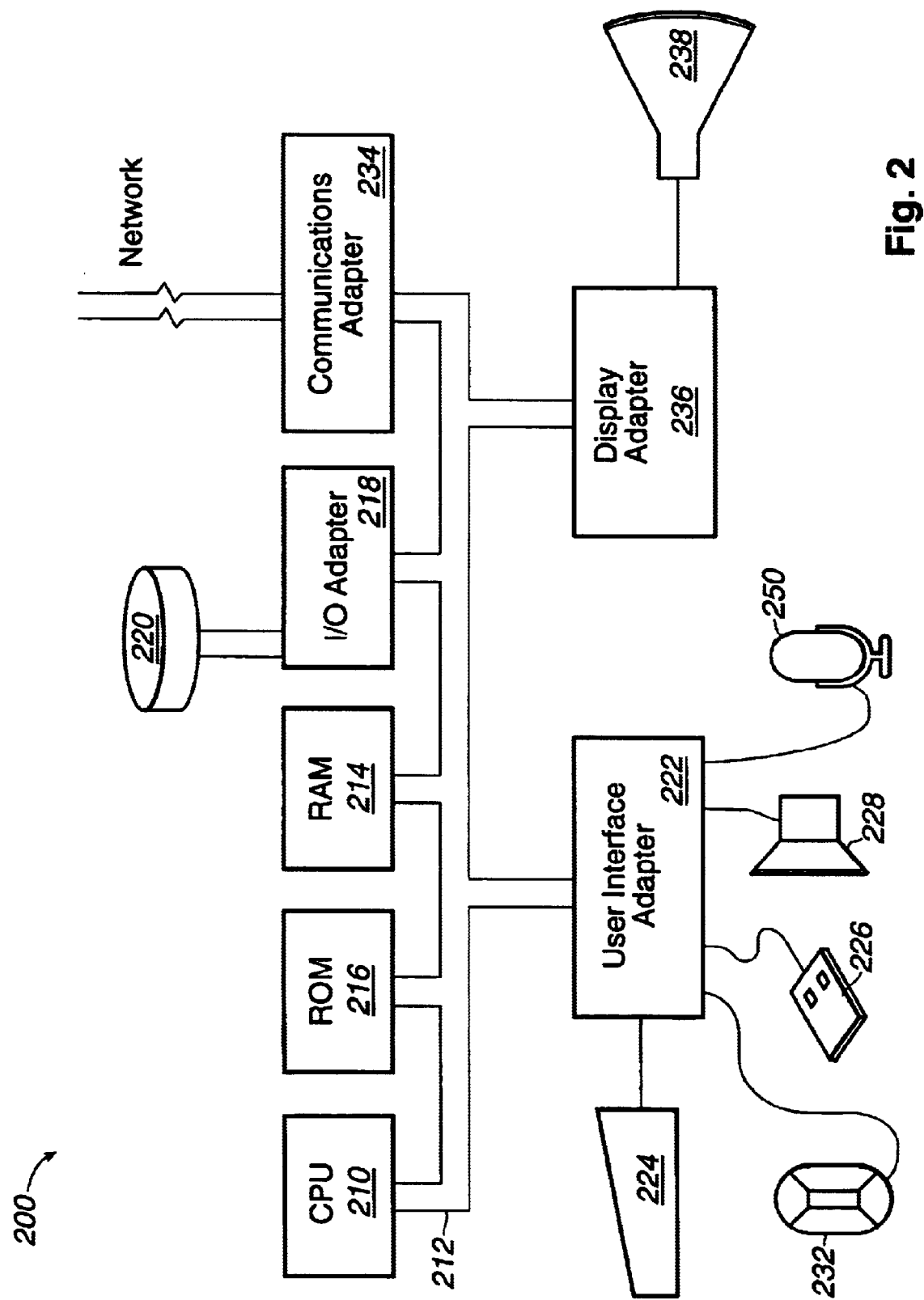
FIG. 2 illustrates, in block diagram form, a data processing system implemented in accordance with an embodiment of the present invention.

Referring next to FIG. 2, an example is shown of a data processing system 200 which may be used to implement servers such as 101, repeaters, such as repeaters 110 and 111, or endpoints, such as endpoints 112–117, executing the methodology of the present invention. The system has a central processing unit (CPU) 210, which is coupled to various other components by system bus 212. Read only memory ("ROM") 216 is coupled to the system bus 212 and includes a basic input/output system ("BIOS") that controls certain basic functions of the data processing system 200. Random access memory ("RAM") 214, I/O adapter 218, and communications adapter 234 are also coupled to the system bus 212. I/O adapter 218 may be a small computer system interface ("SCSI") adapter that communicates with a disk storage device 220. Communications adapter 234 interconnects bus 212 with an outside network enabling the data processing system to communicate with other such systems. Input/Output devices are also connected to system bus 212 via user interface adapter 222 and display adapter 236. Keyboard 224, track ball 232, mouse 226 and speaker 228 are all interconnected to bus 212 via user interface adapter 222. Display monitor 238 is connected to system bus 212 by display adapter 236. In this manner, a user is capable of inputting to the system throughout the keyboard 224, trackball 232 or mouse 226 and receiving output from the system via speaker 228 and display 238.

Preferred implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 3A:
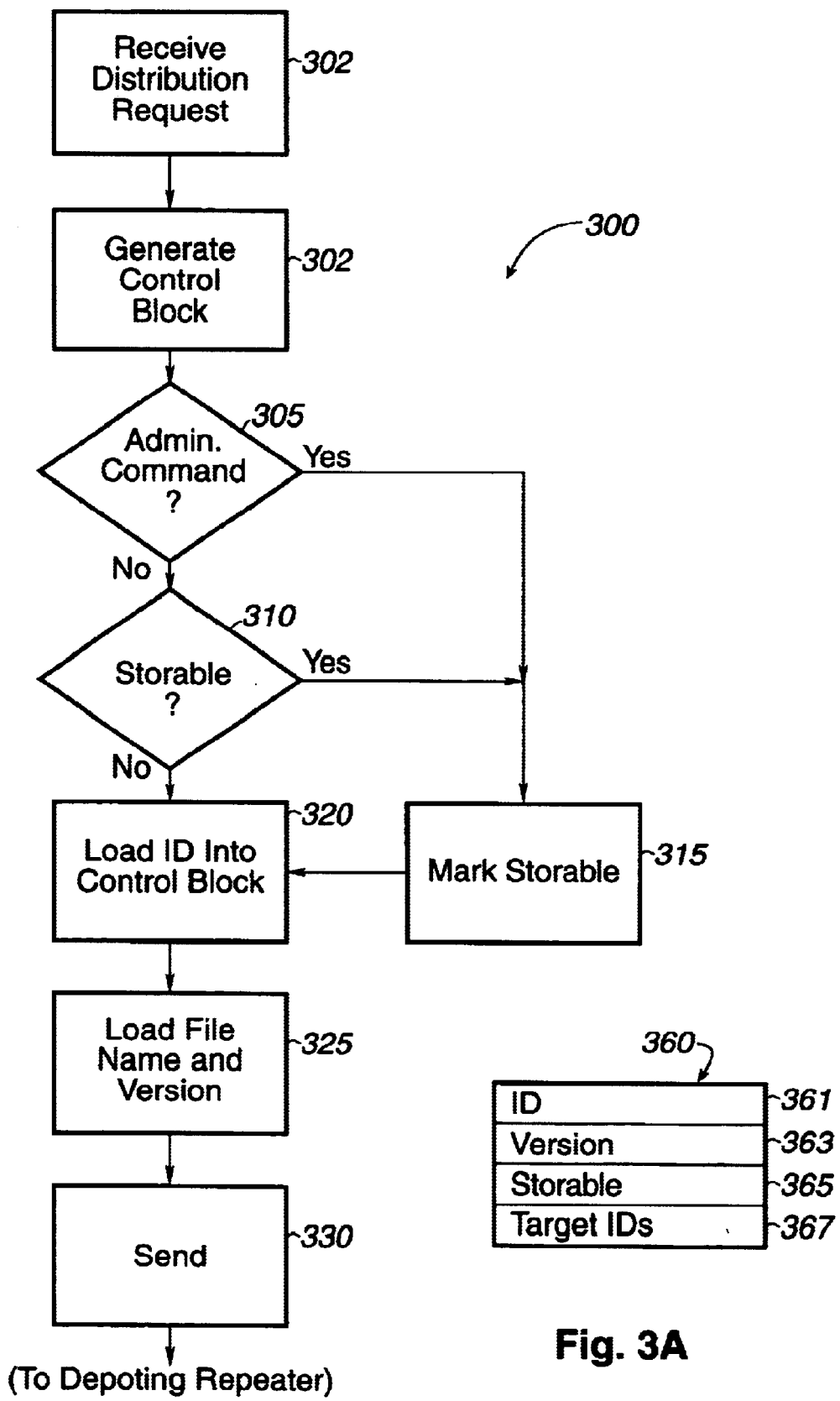
FIGS. 3A and 3B illustrate, in flowchart form, a methodology implemented to depot data in a local repository.
Figure 3B:
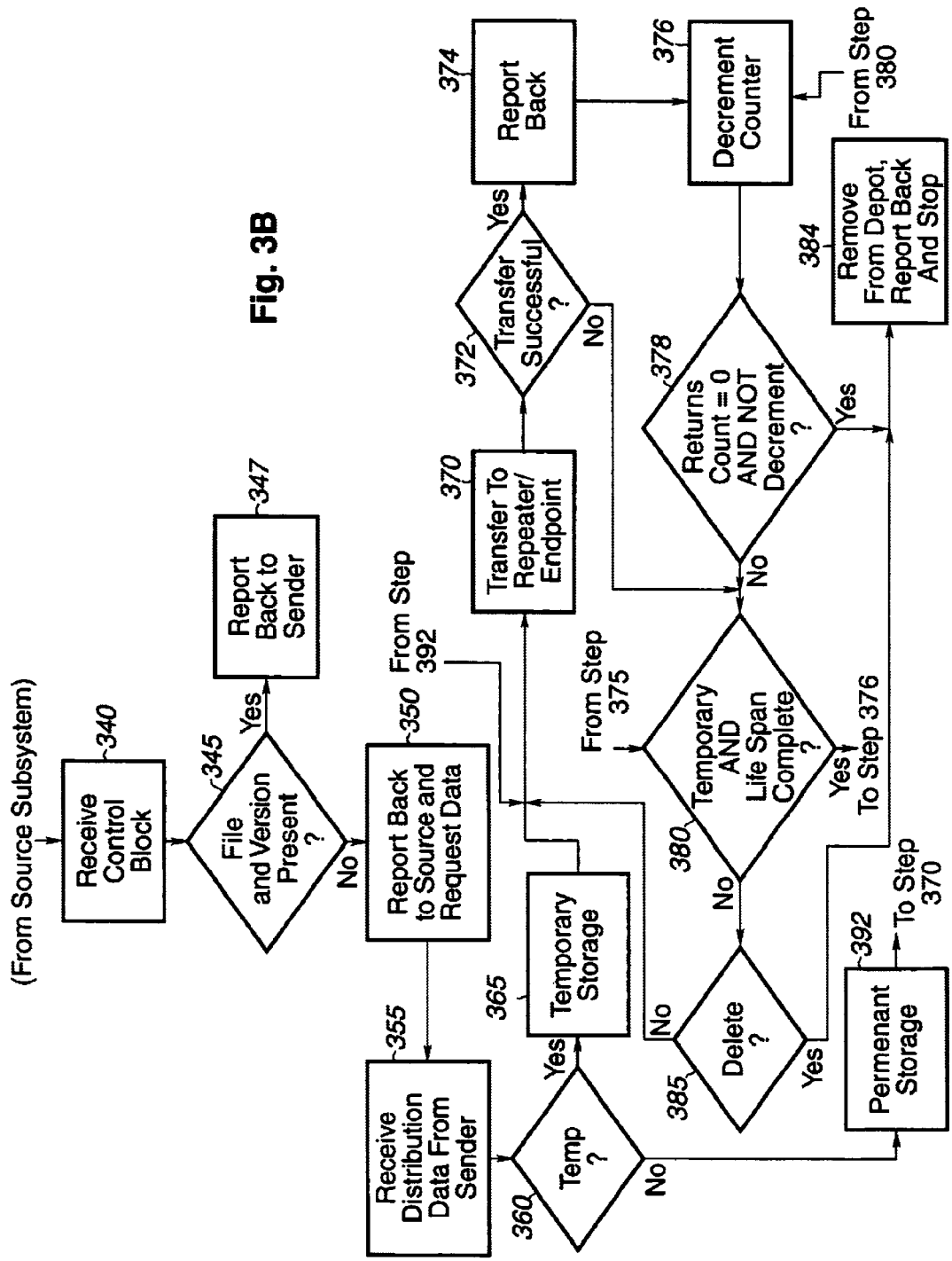

Refer now to FIGS. 3A and 3B in which is illustrated a flow chart of methodology 300 for depoting distribution data. Data may be selectively depoted permanently or, alternatively, temporarily in a local repository. A system administrator may select a distribution for depoting and so initiate an administrative command to depot the transmission. Additionally, an application can identify data for depoting and mark those distribution segments as storable as described in the aforesaid commonly owned co-pending U.S. Patent Application entitled "A Method and Apparatus for Distributing and Collecting Bulk Data Between Data Processing Systems."

When a bulk transmission occurs, the system may initiate a command set to permanently store the bulk data in a local repository. (For the purposes of the present invention, permanently storing, or depoting, distribution data means that the data is stored until deleted in response to an explicit predetermined event, such as a command from a system administrator or expiration of a preselected lifetime.) For example, referring to FIG. 1, if bulk data is to be transferred to endpoints 112–114, the system might establish gateway repeater 118 as the local repository of the bulk data in step 302. Likewise, if 115–117 were to also receive the same data, the administrator might establish gateway repeater 119 as the local repository of the bulk data in step 302. It is important to note that any repeater may be designated as the depot for the data, and it is not limited to gateway repeaters to provide this function and each repeater receiving a distribution may temporarily store the data, in accordance with step 365, FIG. 3B, below.

Referring again to methodology 300, a distribution request is received from a client or from the administrator in step 301. The processing of distribution requests described in the commonly owned, co-pending U.S. Patent Application entitled "A Method and Apparatus for Distributing and Collecting Bulk Data Between Data Processing Systems, incorporated herein by reference. In step 302 a control block is generated. A control block may be a data structure including a pair of string data values containing an identifier and version number uniquely identifying the distribution, and a third data value for tagging the associated distribution as storable. A control block 360 that may be used with the present invention is shown in FIG. 3A. Control Block 360 includes identifier (ID) field 361, version field 363, storable tag field 365, and target ID field 367 which includes a list of repeater and endpoints receiving the distribution. Methodology 300 then determines if an administrative command has been entered to permanently depot the data on an assigned depoting repeater, step 305. If it does, then the data value tagging the distribution as storable control block generated in step 302 will be prepared with the predetermined logic state marking the distribution for permanently depoting the data transmission, step 315. Similarly, in step 310, it is determined if the application has requested the distribution to be storable. If so, the predetermined data value marking the distribution as storable is entered into the control block, for example by setting field 365 in an embodiment of the present invention using data block 360. If in step 310 the application has not requested the distribution be storable, step 315 is bypassed. In step 320 the depoting repeater's identifier is stored into the target ID list in the control block. In step 325 the filename and version of the data transmission is stored into the control block for later use, as described further below. In an embodiment of the present invention using a control block such as control block 360, the identifier and version number may be stored in fields 361 and 363, respectively. Each repeater mediating the distribution is operable for controlling depoting of the distribution in response to information in the control block.

Referring to FIG. 3B, once the transmission commences, the destination repeater receives the control block in step 340. As described above, although not a requirement of the present invention, the depoting repeater may be a gateway repeater such as repeater 118. Once repeater 118 receives the control block, it is determined whether the current version of the distribution is already depoted, step 345. If so, then in step 347, a report is sent back to the distribution source system canceling the distribution, and hence preventing an unnecessary transmission. If the depoting repeater does not have the current version of the transmission then, in step 350, a report is sent back to the distribution source system requesting that the transmission proceed.

When the source system receives the request, the distribution transmission occurs in step 355. The source system will also transmit to the depoting repeater information concerning the allocation of the data, for example the target endpoint machines, and the life span of the data, i.e., how long the transmission should be depoted on the depoting repeater before removing the data from the repeater. A data structure that may be used to pass this information may have the form of a sequence of key/value pairs. A set life span may apply to data that is to be either permanently and temporarily stored. For example, an application update may be transferred to a gateway repeater so that the associated endpoints can receive the update. This may be depoted temporarily until all the endpoint machines can receive the update. However, a preselected time interval, or life span, of the distribution may be specified by the system administrator or requesting application after which the distribution expires. Thus, if one or more of the machines are unavailable during that period, the repeater and thus the network will not be burdened with attempting to transmit data to an unavailable endpoint and the distribution data will be removed from the repeater's storage. Further, permanently stored data may be deleted after the lifetime expires.

Once received, the depoting repeater will allocate the data to its system memory based on whether the data was marked for permanent or temporary storage. This is determined in step 360. If the data is not marked for permanent storage, then the depot will store the data in its temporary storage in step 365. It would be understood by an artisan of ordinary skill that such temporarily stored data may be tagged as deletable by resetting a "locked" bit in a corresponding directory entry, or similar such mechanism, that are known in the data processing art. Temporary distributions may be marked as "temporary" and permanent distributions may, likewise, be marked as "permanent." As described further below, temporary distributions may have an associated reference count that indicates how many repeaters and endpoints require the distribution. When the distribution has been sent to all repeaters and endpoints requiring it, the reference count goes to zero and the distribution is deleted from the depots. Permanent distribution may only be deleted by a request from an administrator.

In step 370, the data is distributed to one of the target endpoints identified in step 355. If the transmission to the endpoint was not successful, as determined in step 372, then the repeater will continue to attempt to transmit the distribution data. Those skilled in the art will understand that the data can be transmitted asynchronously such that parallel transmissions may occur to different machines as described in the commonly owned co-pending U.S. Patent Application entitled "A Service for Distributing and Collecting Bulk Data Between Data Processing Systems," Ser. No. 09/438, 437. In an embodiment of the present invention, multicast connections may be used so that transmissions are not delayed due to an unsuccessful transmission to one machine.

If the transmission to an endpoint or repeater, as appropriate depending on the stage of the distribution, is successfully completed, then a report back to the sender will be sent in step 374. Additionally, a reference counter is maintained that holds a count of the number of endpoints and repeaters requiring the distribution. In step 376, the reference counter is decremented in response to the successful transfer to the target, step 372.

In step 378, it is determined if the reference counter is zero, and the distribution is not tagged for permanent storage. If so, then all endpoints using the distribution have successfully received the data, and in step 384, the temporarily stored data is deleted from the depot, and methodology 300 terminates. If, however, in step 378, all the targets requiring the distribution have not received the distribution, then the reference count is not zero. Then step 378 proceeds by the "Yes" branch to step 380 and it is determined if the distribution is temporary and the distribution life span has expired. If the life span of the data transmission times out as determined in step 380, methodology proceeds to step 376 to decrement the reference counter. The reference counter is decremented to zero. The distribution is then deleted is step 384 as step 378 takes the "Yes" branch. Additionally, in step 384 a report is sent back to the source system including a list of the endpoints that did not receive the data.

Returning to step 380, if otherwise, it is determined that the distribution has not timed out, it is then determined if a delete request has been received, step 385. In an embodiment of the present invention, a delete request may be initiated by a system administrator via a graphical user interface (GUI) provided by the depoting repeater. If a delete request has been received, the data is deleted in step 384 as previously described. Otherwise, methodology 300 returns to step 370 via the "No" branch of step 385 and continues to send data to the targets until either all target repeaters/endpoints have received the distribution or the life span expires.

Returning to step 360, when the distribution received by the depoting repeater is marked for permanent storage as discussed above in conjunction with step 315, the data is loaded into permanent storage in step 392. Methodology 300 then proceeds to step 370, and distribution data transferred to the target endpoints as previously described.

In this way, distribution of bulk data may be held in repositories nearing, within a network architecture, to the using endpoints. Additionally, mobile endpoints, which are transiently connected to the network, may advantageously use depoting. When a mobile endpoint is connected to the network, it can query its local repository designated for that endpoint for any data transfer that is pending for it. For example, when a mobile endpoint is connected to a gateway such as repeater 118 in FIG. 1, it may query the gateway's depoted data bank to determine if an update is due. By depoting the data on a repeater, mobile endpoints can obtain the data therefrom (possibly in several steps as the mobile system connects and disconnects) without having to remain connected to the network to receive the distribution in its entirety. Furthermore, in conjunction with checkpoint restart, the sending repeater queries the target for the starting point of the distribution, and, if the target has all of the data, no transmission will be necessary. Checkpoint restart is described in detail in the commonly owned, co-pending U.S. Patent Application entitled "Apparatus for Restarting Interrupted Data Transfer and Method Therefor," incorporated herein by reference. The using application can then process the data distribution while disconnected from the network.

The foregoing has outlined rather broadly the features and technical advantages of the present invention in order that the detailed description of the invention that follows may be better understood. Additional features and advantages of the invention will be described hereinafter which form the subject of the claims of the invention. Although the present invention and its advantages have been described in detail, it should be understood that various changes, substitutions and alterations can be made herein without departing from the spirit and scope of the invention as defined by the appended claims.

What is claimed is:

1. A data processing system for distributing bulk data on a network comprising:
at least one source subsystem providing bulk data to be distributed; and
one or more repeater subsystems for receiving said bulk data and storing said bulk data for transmission to one or more endpoint systems, wherein each of said at least one source subsystem includes circuitry operable for generating control information for controlling the storage of said bulk data on said one or more repeater subsystems and circuitry for including said control information in a transmission of said bulk data to said one or more repeater subsystems, and wherein each of said one or more repeater subsystems include circuitry operable for controlling said storing of said bulk data in response to said control information.

2. The data processing system of claim 1 wherein said control information is set to a first predetermined value when said bulk data is to be permanently stored and a second predetermined value when said bulk data is to be temporarily stored.

3. The data processing system of claim 2 wherein said control information is set to a selected one of said first and second values in response to an administrator command.

4. The data processing system of claim 2 wherein said control information is set to a selected one of said first and second values in response to a distribution request from an application on at least one of said one or more endpoint subsystems.

5. The data processing system of claim 1 wherein each of said one or more source subsystems further includes circuitry operable for including lifetime information in said bulk data, wherein each of said one or more repeater subsystems further include circuitry operable for deleting stored bulk data in response to said lifetime information.

6. A method of distributing data on a network comprising the steps of:
generating control information for controlling storage of distributed data;
receiving said data at a network node distributed; and
storing said distributed data in said network node wherein said storing is permanent if said control information has a first predetermined value and temporarily if said control information has a second predetermined value.

7. The method of claim 6 further comprising the step of including lifetime information in said distributed data, said lifetime information for controlling a duration of said storing of distributed data.

8. The method of claim 6 further comprising the step of deleting said distributed data from said network node after all endpoint subsystems requesting said distributed data have received said distributed data, if said control information has said second predetermined value.

9. The method of claim 6 wherein said control information is operable for setting to a selected one of said first and second predetermined values in response to an administrator command.

10. The method of claim 6 wherein said control information is operable for setting in response to an application requesting said distributed data.

11. The method of claim 7 further comprising the step of deleting said distributed data from storage after a time interval corresponding to said lifetime information has expired.

12. The method of claim 6 further comprising the steps of:
receiving a delete request in response to an administrator command; and deleting said distributed data from storage in response to said delete request.

13. The method of claim 8 wherein said step of deleting said distributed data after all endpoint systems have received said distributed data includes the steps of:
initializing a reference counter to a preselected number of endpoints subsystems requesting said distributed data;

decrementing said reference counter in response to a successful transmission of said distributed data to an endpoint subsystem;

testing said reference counter, and if said reference counter is not zero, repeating said decrementing step; and if said reference counter is zero, deleting said distributed data from said network node.

14. A computer program product embodied in a machine-readable storage medium including programming for distributing data on a network, the programming comprising:

programming for generating control information for controlling storage of distributed data;

programming for receiving said distributed data a network node; and programming for storing said distributed data in said network node, wherein said storing is permanent if said control information has a first predetermined value and temporary if said control information has a second predetermined value.

15. The computer program product of claim 14 further comprising programming for including lifetime information in said distributed data, said lifetime information for controlling a duration of said storing of distributed data.

16. The program product of claim 14 further comprising programming for deleting said distributed data from said network node after all endpoint subsystems requesting said distributed data have received said distributed data, if said control information has said second predetermined value.

17. The program product of claim 14 wherein said control information is operable for setting to a selected one of said first and second predetermined values in response to an administrator command.

18. The program product of claim 14 wherein said control information is operable for setting in response to an application requesting said distributed data.

19. The program product of claim 15 further comprising programming for deleting said distributed data from storage after a time interval corresponding to said lifetime information has expired.

20. The program product of claim 14 wherein said programming for deleting said distributed data after all endpoint subsystems have received said distributed data includes:

programming for initializing a reference counter to a preselected number of endpoint subsystems requesting said distributed data;

programming for decrementing said reference counter in response to a successful transmission of said distributed data to an endpoint subsystem;

programming for testing said reference counter, and if said reference counter is not zero, repeating said decrementing steps; and if said reference counter is zero, deleting said distributed data from said network node.

* * * * *